UNITED STATES PATENT OFFICE.

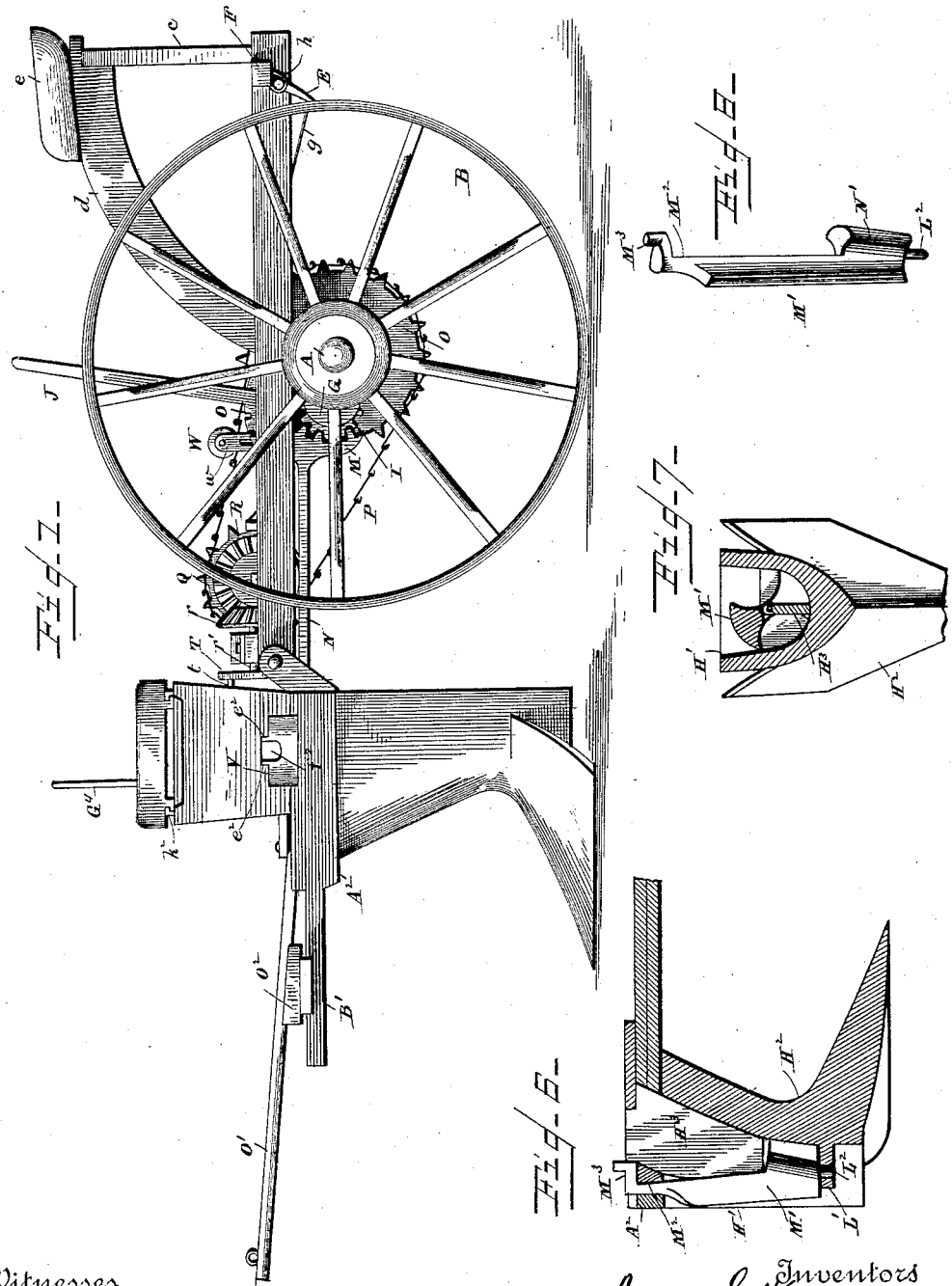

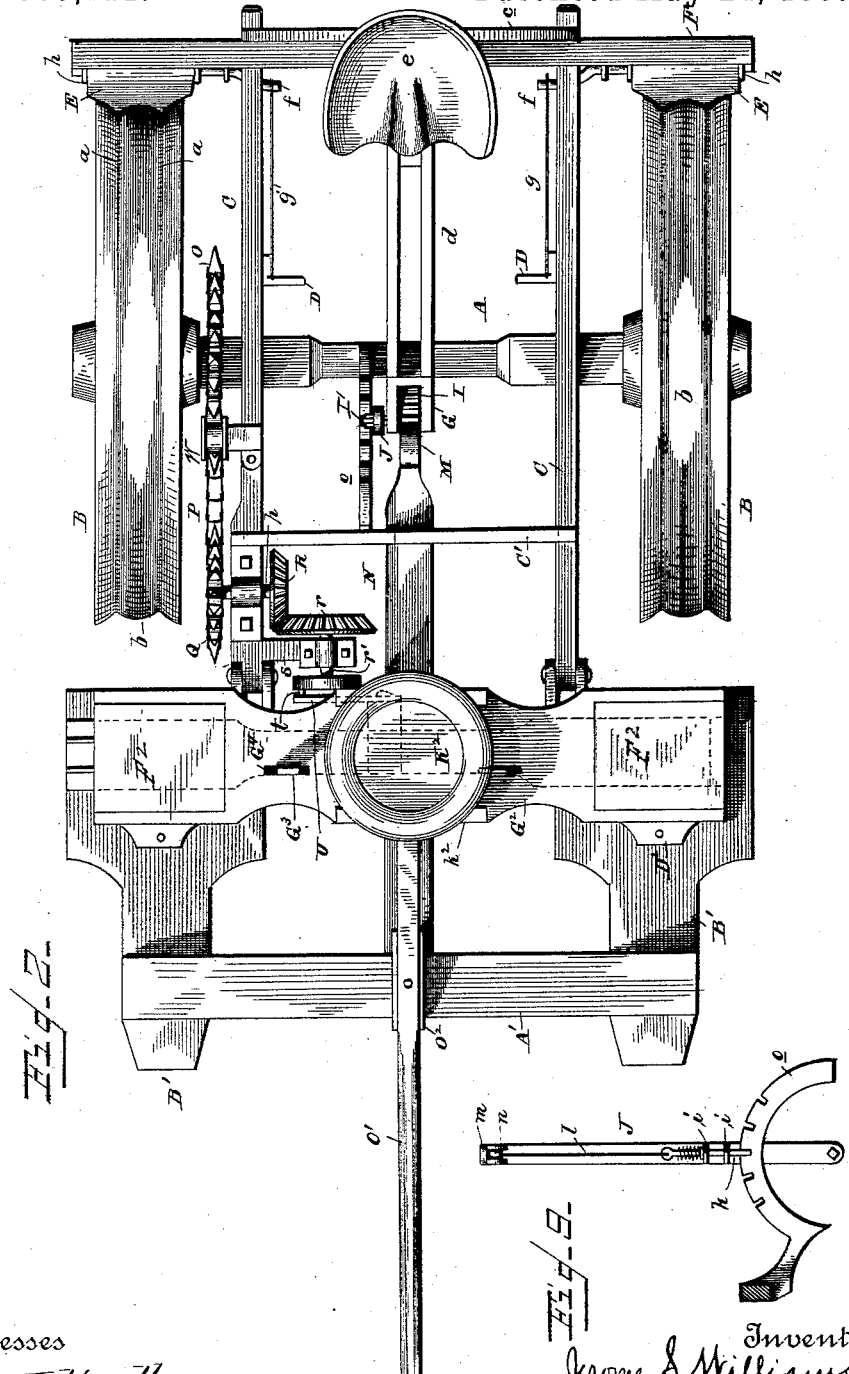

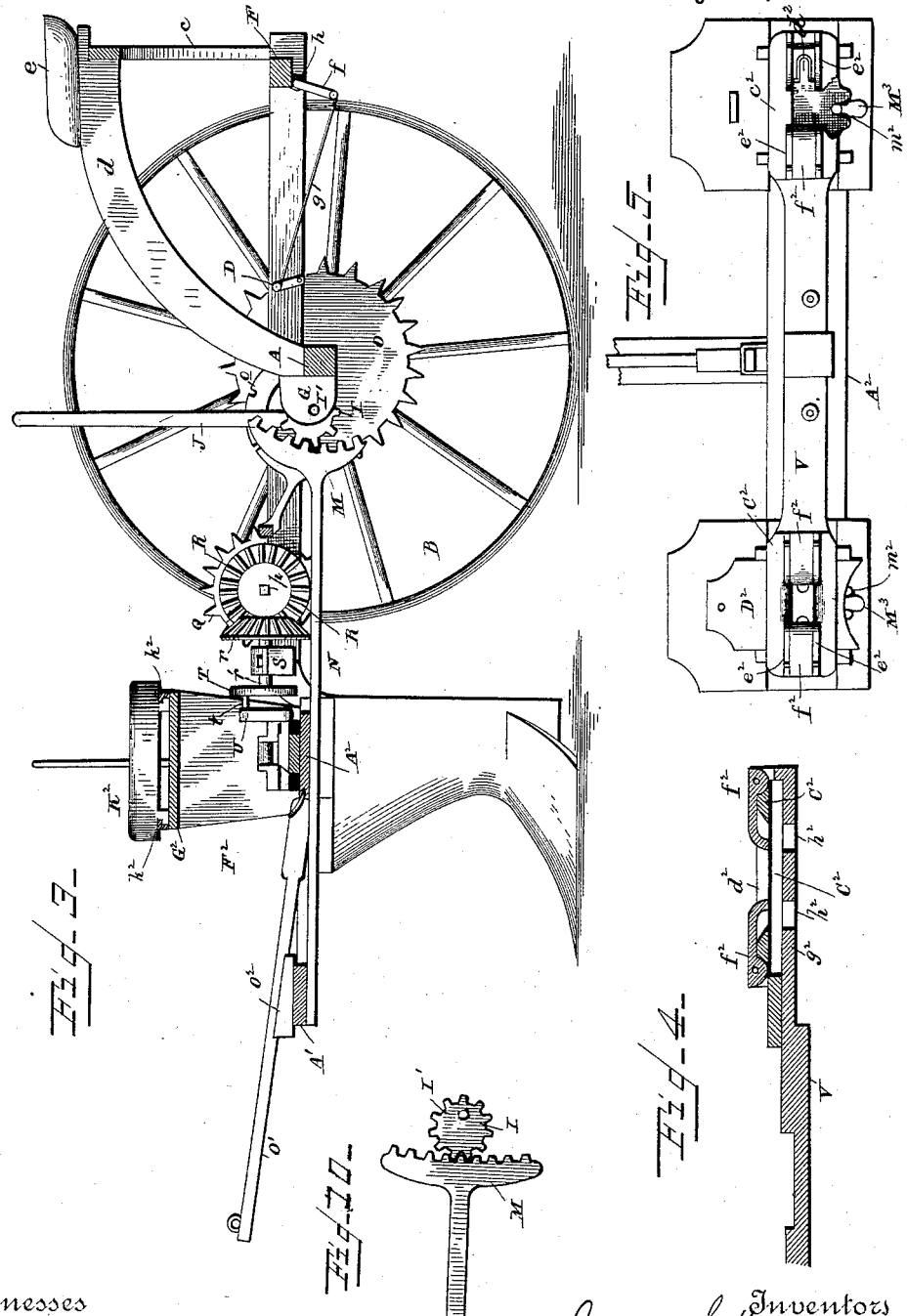

JEROME S. WILLIAMS AND BENJAMIN F. WHITNEY, OF GARNETT, KANSAS, ASSIGNORS, BY DIRECT AND MESNE ASSIGNMENTS, TO SAID BENJAMIN F. WHITNEY, ELIAS H. DAVIS, AND WALTER DAVIS, ALL OF SAME PLACE.

DOUBLE LISTER CORN DRILL AND PLANTER.

SPECIFICATION forming part of Letters Patent No. 363,711, dated May 24, 1887.

Application filed December 20, 1886. Serial No. 222,059. (No model.)

*To all whom it may concern:*

Be it known that we, JEROME S. WILLIAMS and BENJAMIN F. WHITNEY, citizens of the United States, residing at Garnett, in the county of Anderson and State of Kansas, have invented certain new and useful Improvements in Double Corn Drills and Planters; and we do hereby declare the following to be a full, clear, and exact description of the invention, such as will enable others skilled in the art to which it appertains to make and use the same.

This invention relates to that class of drills or planters which may be operated either automatically or by hand, as required—automatically by means of suitable sprocket-chains and gearing imparting motion to the seed-slides from the driving-wheels, and by hand through the medium of a lever arranged near the seat of the operator when the gearing is disconnected from the seed-slides—and it has for its object to provide a simple, durable, and effective machine; and it consists of the parts and combinations of parts hereinafter described and claimed.

In the accompanying drawings, forming a part of this specification, Figure 1 is a side elevation of our improved machine; Fig. 2, a plan view; Fig. 3, a longitudinal section; Fig. 4, a detail sectional view of one end of the seed-slide; Fig. 5, a plan view of the seed-slide with the seed boxes or hoppers removed; Fig. 6, a detail sectional view of the seed-tube with flirt-valve in place; Fig. 7, a detail horizontal section of the same; Fig. 8, a perspective view of one of the flirt-valves; Fig. 9, a detail view of the segment rack and lever; and Fig. 10 is a detail view of the segment M and cog-wheel I, the segment being on the arc of a greater circle than as shown in the other views and the cog-wheel being eccentrically journaled.

Similar letters refer to similar parts throughout all the views.

A represents the axle on which the driving-wheels B are journaled. The peripheries of these wheels are double concaved or formed with two grooves, $a$, the bottoms of which are rounded, while the central or middle portions, $b$, of said peripheries are slightly convex, so that ridges will be raised on each side of the seed in the furrow and the earth compacted on the same in a manner best calculated to fully cover it.

C represents two longitudinal beams, which are secured to the axle A in any suitable manner and extend beyond the wheels B, both in the front and rear of the same. To these beams, at the rear, a bow or semicircular brace, $c$, is attached, which, in connection with the brace $d$, attached to the axle A and curving backward therefrom, serves to support the driver's seat $e$. The curved brace $d$ is shown, Fig. 2, as formed of two bars; but it may be of a single bar, if preferred.

D D are bent levers pivoted to the inner sides of the beams C, slightly back of axle A and directly opposite each other, and connected by means of rods $g$ to the arms $f$ of scrapers E, the inner ends of which have their bearings in the beams C and their outer ends in lugs or ears $h$, which project downward from the outer ends of the cross-beams F, secured to the beams C, and extend outwardly beyond the wheels B. The edges of scrapers E are formed to correspond with the shape of the peripheries of the wheels, so as to enter the grooves $a$ and clear the same. The location of the levers D renders it easy for the driver to operate the same with his feet.

At about the center of the axle A we attach an open boxing or housing, G, within which is loosely journaled a cog-wheel, I, mounted eccentrically on shaft I', which meshes with a cogged segment, M, formed upon the rear end of the beam N of the hinged frame forming the front portion of the machine. To one end of the shaft of the cog-wheel I a lever, J, is secured, so as to rotate the same when the lever is moved, and thus raise or lower the front of the machine.

To the side of the hand-lever J guides $i$ are secured, through which a spring pawl or catch, $k$, works, and to the upper end of this catch a rod, $l$, is connected, which runs along the lever J, and is secured to a thumb-lever, $m$, pivoted in any suitable manner to the short arm $n$, projecting laterally from the upper end of said lever J. (See Fig. 9.) Immediately beneath the lower end of the pawl $k$ a segment ratchet or rack, $o$, is secured at one end to the axle A and at the other to the cross bar or beam C', within the interdental spaces of which the pawl $k$ catches for the purpose of holding the hinged frame in any position to which it may be adjusted by lever J, cog-wheel I, and segment M.

O represents a sprocket-wheel, which is secured in any suitable manner to the inner end of the hub of one of the wheels B, so as to turn with the same, and over which a sprocket-chain, P, passes to a sprocket-wheel, Q, of smaller diameter, in line therewith, which is journaled on one end of a short shaft, $p$, having its bearing on one of the beams C. On the opposite end of shaft $p$ a beveled gear-wheel, R, is journaled, which meshes with a beveled gear-wheel, $r$, journaled on a short shaft, $r'$, having its bearings on a beam, S, projecting laterally from one of the beams C. To the other end of shaft $r'$ a wheel, T, is journaled, which carries an eccentric-pin, $t$, to which is loosely secured one end of a short pitman-rod, U, the other end of the pitman being adjustably secured to the center of the seed-slide V.

W is a tension-pulley having its bearing in an adjustable support, W', projecting from one of the beams C, so as to tighten or loosen the sprocket-chain P. Hinged or pivotally secured to the front ends of the beams C is the seed-box-carrying frame, which consists of the cross-bars A' A² and longitudinal beams B'. On the upper surface of the beams A² the seed-slide V works. At each end of this slide it is enlarged, and a slot, C², cut therein from side to side, as clearly shown in Fig. 4, while through the upper plates, $c^2$, of said ends an opening or slot, $d^2$, is formed, the ends of which are beveled, as shown in the figure named, and also at the right-hand side of Fig. 5. Pivotally secured between flanges $e^2$ on the upper plate, $c^2$, are valves or cut-offs $f^2$, which are beveled on their free ends. In the lower plates, $g^2$, of the seed-slide square openings $h^2$ are formed, which communicate with the seed-tubes beneath.

In each of the slots C² above named a plate, D², having two round openings or perforations therein, which communicate with the square openings $h^2$ in the lower plate of the seed-slide alternately as the same is reciprocated, permitting the seed to drop through into the tubes, is inserted and secured by a pin passing into beam B'. As will be understood from the above description, the outer and inner openings, $h^2$, respectively, will be closed and opened alternately as the slide is moved, the valves or cut-offs $f^2$ closing and opening the same at each reciprocation of the seed-slide. The seed-hoppers F² are secured in any suitable manner at each side of the frame above the ends of the seed-slide, which has a free movement thereunder.

As clearly shown in the side view, Fig. 1, the seed-slide fits within recesses cut in the ends of the boxes F², and practically forms a sliding valved bottom therefor. The two boxes or hoppers F² are connected by a beam, G², at about the center of which ways $k^2$ are formed, in which a sliding seat, K², is fitted so as to be removable and adjustable. At equal distance apart in the beam G² are formed two perforations, G³, through either of which a lever, G⁴, may be passed and its lower end inserted in a corresponding opening in the seed-slide V, to operate the same when it is desired to drop the seed by hand, first having disconnected the pin of the pitman from said slide.

The seed-tubes H' are formed in the rear of the opening-plows H², the two being cast or formed integral, if desired, as may also the uprights and shares of the plows. The tubes are divided by a vertical partition, H³, into two compartments, each of which compartments is inclined forward or toward the front from about one-third of its length from the bottom to its top, the remaining or lower part being nearly if not quite vertical. The partitions H³ extend only about two-thirds of the length of the tubes. In the bottoms of the tubes blocks L' are rigidly secured to form bearings for the pins L² of the seed-valves M'. The upper ends of these valves are provided with rounded necks M², which fit loosely in openings in the beam A², which has a crank-arm, M³, which works or fits in a slot, $m^2$, formed in the seed-slide V, by which they are oscillated and the compartments in the tubes opened and closed alternately to drop or permit the escape of the seed from the tubes. The valves M' are triangular in shape and have their sides slightly concaved, so as to form, in connection with the interior of the seed-tubes, which are also rounded out or concaved, oblong chambers or tubes. This construction facilitates the escape of the grain or seed from the tubes.

From the bottoms of the valves M', for about one-third of their lengths up the valves, a projection, N', is formed, which is also triangular in shape and is concaved on each side similar to the body of the valve. These projections are preferably formed in one piece with the valves and have their concaved faces or sides facing the concaved sides of the valves, thus forming a semicircular groove or gutter at each side of the lower ends of the valve. These projections N' form the bottoms of the compartments formed by the partitions H³.

O' is a tongue which is hinged or otherwise secured to the beam A² at one end, so as to be easily raised or lowered.

O² is a wedge-shaped block, which is grooved on its upper surface, so as to fit on each side of the tongue O', which rests on the same. The block O² rests on the beam A' and has a slot therein, through which and an opening in the tongue a pin is passed to secure the tongue to the said beam. By merely moving the block in or out the tongue is raised or lowered and held in the position to which it may be adjusted. The mold-boards and uprights for the plows are cast in one piece.

It will be readily understood from the above description that the plows first open the furrows, making two rows at a time, and that the drilling of the grain is done automatically and continuously while the machine is in motion through the medium of the sprocket-wheels, sprocket-chain, gear-wheels, and pitman connected to the seed-slides, a reciprocating movement being given the latter, which in turn oscillates the valve M', which opens and closes the tubes alternately, and also facilitates the egress of the grain. When it is desired to plant the corn in hills, the pin connecting the pitman with the slide is removed and the operator, from his seat on the beam connecting the hoppers, throws the seed-slide back and forth with the hand-lever. The dropping may also be performed by means of the mechanism heretofore described for drilling, it only being necessary to substitute a sprocket-wheel of a different diameter as the distance apart it is desired to plant. The driving-wheels follow immediately over the furrow, and, owing to their peculiarly-constructed peripheries, cover the seed completely with the soil.

We are aware that a seed-slide has heretofore been driven by sprocket-wheels, sprocket-chain, and bevel gear-wheels, the latter being arranged on the front or hinged part of the planter, and we do not desire to be understood as claiming such mechanism, broadly, but simply in combination with other elements and when arranged wholly on the main frame of the machine.

Having thus described our invention, what we claim as new, and desire to secure by Letters Patent, is—

1. In a corn-planter, the combination of the main frame, the hinged frame having a rearwardly-projecting beam, N, rigidly secured thereto, and having the cogged segment M formed thereon, the cog-wheel I on the shaft I', housing G, the hand-lever J, the spring-pawl $k$, guides $i$, rod $l$, thumb lever $m$, and the rack $o$, whereby the front end of the planter may be adjusted and held in its adjusted position, substantially as described.

2. In a corn-planter, the combination of the axle A, the wheels B, sprocket-wheels O Q, a sprocket-chain, P, an adjustable tightener-pulley, W, shaft $p$, journaled in one of the beams C of the main frame, the bevel gear-wheels R $r$, the shaft $r'$, having its bearing in a beam, S, the crank-wheel T, having eccentric-pin $t$, and the pitman U, suitably connected with the seed-slide, whereby the whole driving mechanism is supported by the main frame in the rear and independent of the hinged frame, as set forth.

3. The combination, in a corn-planter, with the main frame, the hinged frame carrying the seed-tubes and plows, said tubes being divided vertically by a partition, the triangular valves M', having concaved sides, and the triangular projection N', concaved on each side, of the seed-slide V, having the slotted ends, the upper plates, $c^2$, having the slots $d^2$, the lower plates, $g^2$, having the square openings $h^2$, the plate $D^2$, having the round openings, and the cut-offs $f^2$, substantially as described.

4. The combination, in a seed-slide for corn-planters, of the slide V, having its ends slotted at right angles to its length, the slotted upper plate, $c^2$, the lower plate, $g^2$, having the square openings $h^2$, the perforated plate $D^2$, the flanges $e^2$, and hinged valve $f^2$, substantially as described.

In testimony whereof we affix our signatures in presence of two witnesses.

JEROME S. WILLIAMS.
BENJAMIN F. WHITNEY.

Witnesses:
GEO. W. ILER,
GEO. McCRUM.